INVENTOR.
Ernst Roesch

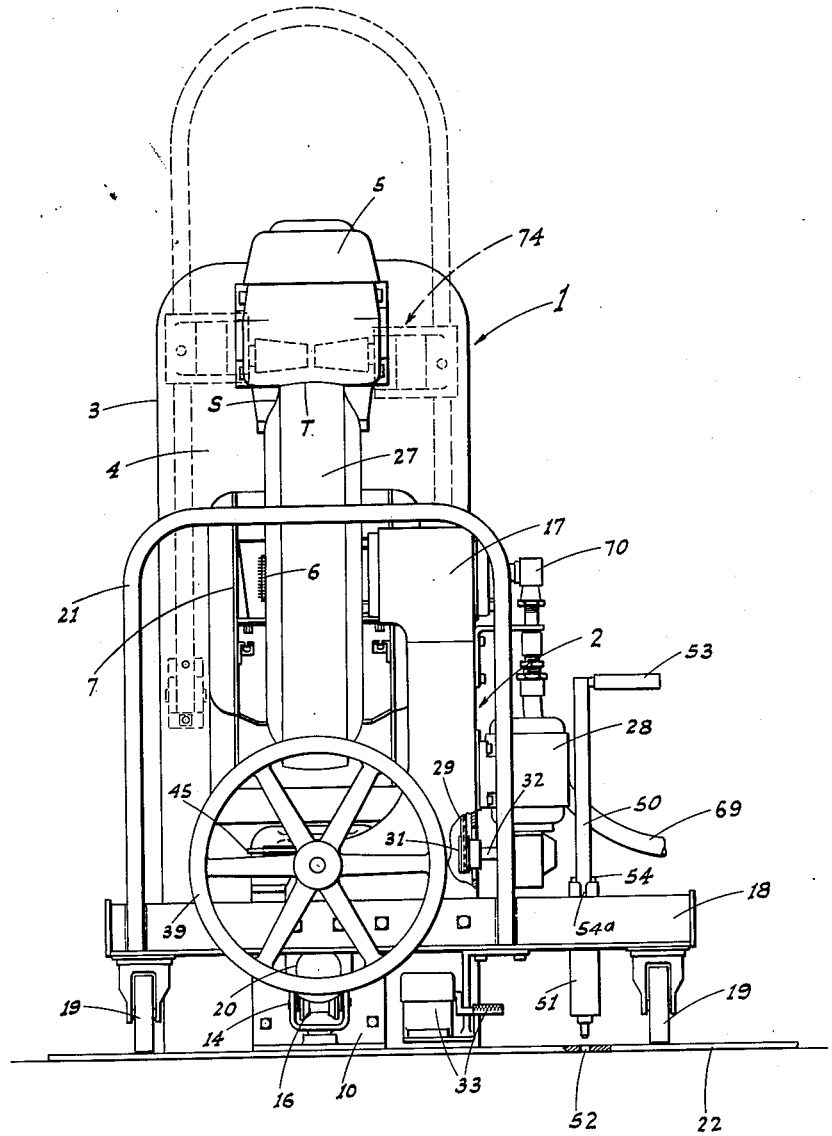

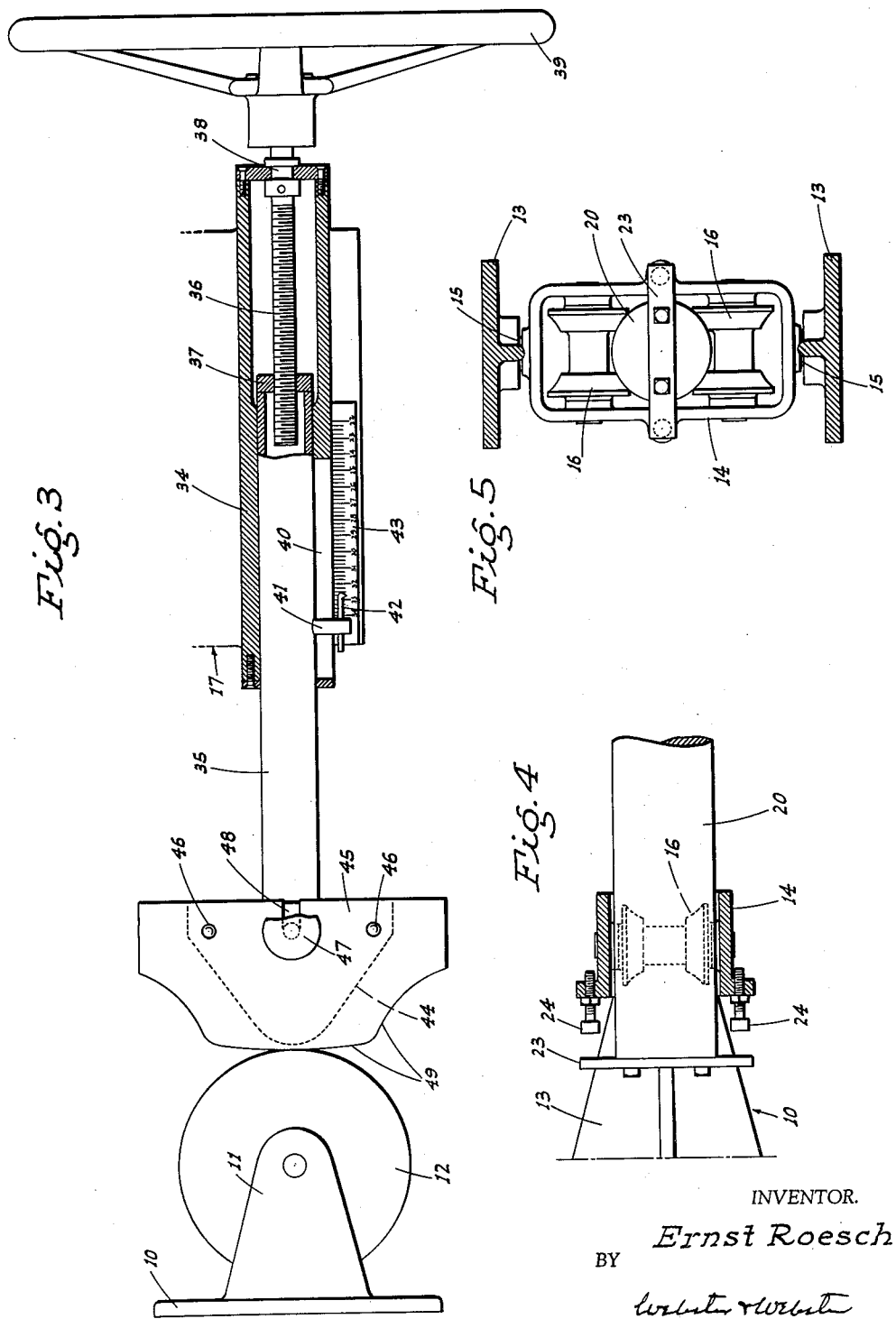

INVENTOR.
Ernst Roesch
BY
*[signature]*
ATTYS

United States Patent Office 2,985,231
Patented May 23, 1961

2,985,231
TIRE BUFFING MACHINE

Ernst Roesch, Lodi, Calif., assignor to Super Mold Corporation of California, Lodi, Calif., a corporation of California Filed Feb. 9, 1959, Ser. No. 791,906
4 Claims. (Cl. 157—13)

This invention relates in general to the tire retreading industry, and in particular is directed to a novel machine for buffing worn tires to a predetermined contour and preparatory to the tread building operation; i.e., the application of new tread rubber or "camelback" on the tire before tread vulcanization thereof.

The major object of this invention is to provide a machine by means of which the tread and adjacent sidewall portions of the tire may be accurately buffed, under mechanical control, to a predetermined contour and without any guess-work or intermediate measuring operations being necessary. Not only is the need for a particularly skilled operator eliminated, but precise buffing may be accomplished easier and faster than has heretofore been possible.

Another important object of the invention is to provide a buffing machine, as above, which includes an interchangeable contour determining template arranged so that as each tire is buffed, a predetermined contour of the tread and adjacent sidewall portions of the tire will be attained.

An additional object of the invention is to provide a buffing machine arranged to receive tires of any diameter, within certain limits, while enabling the accurate tread and sidewall buffing action to be maintained on any such tire.

The machine includes a buffing rasp mounted for engagement with a wheel-supported tire to be buffed, and a further object of the invention is to provide a dust-collecting suction hood arranged in relation to the rasp and tire so that practically all the dust buffed from the tire is instantly drawn away and will not escape into the atmosphere adjacent the operator.

A still further object of the invention is to provide the machine with an instrumentality which will accurately indicate the over-all diameter of the tire after buffing, so that the proper matrix size for the subsequent retread vulcanization will be automatically determined without any manual measuring being necessary.

It is also an object of the invention to provide a practical, reliable, and durable tire buffing machine, and one which will be exceedingly effective for the purpose for which it is designed.

These objects are accomplished by means of such structure and relative arrangement of parts as will fully appear by a perusal of the following specification and claims.

In the drawings:

Fig. 2 is a front end view of the machine.

Fig. 3 is a fragmentary enlarged sectional plan view, taken substantially on line 3—3 of Fig. 1.

Fig. 4 is a similar view, taken substantially on line 4—4 of Fig. 1.

Fig. 5 is a fragmentary enlarged transverse section taken on line 5—5 of Fig. 1.

Figure 1:
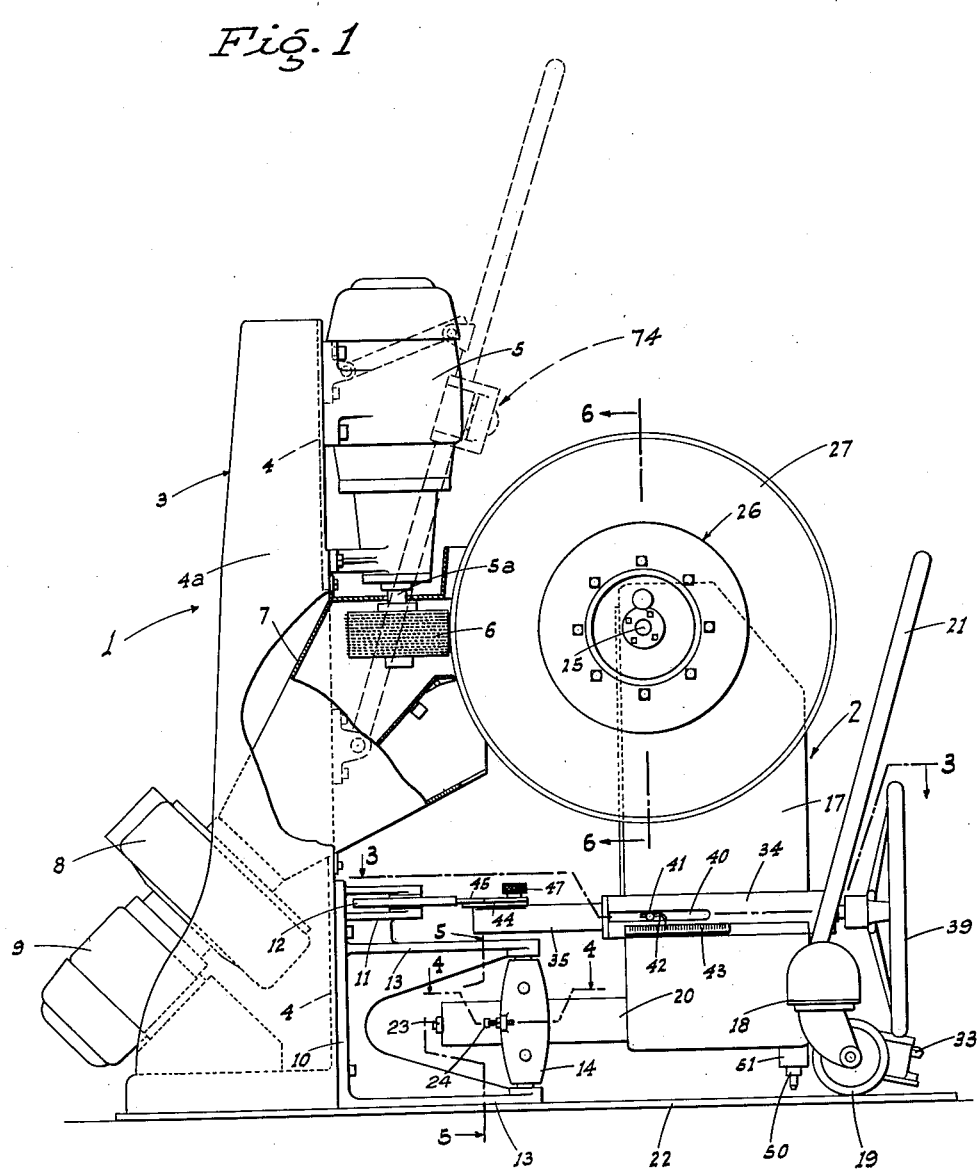
Fig. 1 is a side elevation of the machine, partly broken out and in section, showing a wheel-supported tire in position to be buffed.

Referring now more particularly to the drawings, and to the characters of reference marked thereon, the machine comprises a stationary unit, indicated generally at 1, on which the buffing rasp is mounted, and a movable tire supporting unit or carriage, indicated generally at 2, on which the tire to be buffed is mounted.

The stationary unit 1 includes a rigid upstanding frame 3 having a vertical front wall 4 and side flanges 4a. Secured against the wall 4 at the upper end thereof is a vertical-axis, reversible electric motor 5 having a depending shaft 5a on which a rotary buffing rasp 6 is mounted. The rasp is disposed within a forwardly projecting hood 7 adjacent the front end thereof; the hood being mounted on and projecting through the front wall 4 with a downward slope from the rasp. At its lower rear end, the hood is connected to the intake of a suction fan 8 which is directly driven by an electric motor 9.

Secured against the lower end portion of the front wall 4 is a relatively short upstanding frame 10 which—adjacent its upper end—includes forwardly projecting, vertically spaced ears 11 between which a vertical-axis roller 12 is mounted. The axis of the roller is alined with that of motor 5 and the rasp 6, while the diameter of the roller is the same as that of the rasp 6, as shown in Fig. 1. The frame 10 includes other vertically spaced, forwardly projecting ears 13, below and extending ahead of ears 11.

A substantially rectangular yoke 14 is disposed between ears 13 and is turnably supported therefrom by vertical-axis end trunnions 15 (see Fig. 5); said axis being alined —transversely of the machine—with the axis of the rasp 6. Mounted in the yoke are transverse, vertically spaced guide rollers 16. These rollers, the yoke 14, and the roller 12 cooperate with certain features of the movable tire supporting unit or carriage 2, as will now be described.

Such carriage 2 comprises an upstanding rigid pedestal 17 to which—on its front side—a transverse cross beam 18 is secured, and which is supported at its ends by caster wheels 19. A rigid beam or shaft 20 projects rearwardly from the pedestal 17 at a level to project through yoke 14 between the rollers 16 in supported and slidable relation.

A suitable handle bar 21 upstands from cross beam 18 so that the carriage 2 can be readily manipulated and moved relative to the stationary unit 1. In order to provide a smooth and level surface for the caster wheels 19, a metal floor plate 22, rigid with frame 3 of unit 1, projects forwardly therefrom; said plate being of sufficient area to support the wheels 19 in any adjusted position of said carriage 2. In order to prevent the beam 20 from being pulled forwardly and clear of rollers 16, a cross bar 23 is fixed on the beam at its rear end, which bar is adapted to engage stops 24 projecting from the yoke 14 at the sides thereof (see Figs 4 and 5).

The pedestal 17, adjacent its upper end, supports a transverse rotary spindle 25 disposed at the level of the rasp 6. A wheel 26 is fixed on the spindle and supports the tire 27, to be buffed, in a transverse position centered with beam 20 and also normally centered with the rasp 6. The specific construction of the wheel 26 will be described later.

An electric motor 28 is mounted on the pedestal 17 on the laterally outer side thereof, and spindle 25 is driven from such motor by means of a chain drive 29 within the hollow pedestal 17, and which drive includes an upper sprocket 30 secured to spindle 25 and a lower sprocket 31 secured to the transverse motor-driven shaft 32.

Operation of motor 28 may be controlled by manipulation of a foot switch 33 depending from cross beam 18 in a position convenient to the operator; said switch being interposed in the circuit (not shown) of the motor.

A sleeve 34—rigid with the pedestal 17—is disposed parallel to, and directly above, beam 20, and at a level just below roller 12. A hollow bar 35 is slidably and non-turnably mounted in, and projects from, the rear end of the sleeve. Longitudinal movement of the bar 35 is controlled by a screw shaft 36 threaded through a nut 37 secured to the forward end of the bar 35. The screw shaft is mounted against longitudinal movement in the forward end of sleeve 34, as shown at 38, and ahead of the sleeve is fitted with a hand wheel 39 disposed in front of the cross beam 18.

The laterally outer face of the sleeve 34 is provided with a longitudinal slot 40 through which a pin 41, rigid with the bar 35, projects. The pin carries a pointer 42 which reads on a scale 43 extending along the slot and which is graduated and marked to denote tire-diameter sizes.

Mounted on the rear end of bar 35 is a supporting plate 44 for a removable template 45. The template 45 is removably located and secured on the plate 44 by means of dowels 46 on said plate projecting through matching holes in the template, and a hand clamping screw 47 adjustably mounted in said plate, and whose head overlaps the template in clamping relation; the template having an open-ended slot 48 through which the screw below its head may pass when mounting the template, without having to remove the clamping screw.

The rear edge of the template 45 engages the periphery of roller 12, and such edge 49 is shaped to exactly the same contour to which the tire is to be buffed. Thus, the contour of the tread surface T of the tire, and also the adjacent portions of the sidewalls S, will—by the buffing action of the rasp—be cut to the same contour as said template upon operation of the machine in the manner hereinafter described.

In order that the carriage 2 may be held from swinging when retracted relative to stationary unit 1, a vertical locking rod 50 is slidably mounted in a supporting sleeve 51 fixed on the cross beam 18 to one side of the pedestal 17; the lower end of said rod being adapted to enter a suitably positioned orifice 52 in the floor plate 22 (see Fig. 2). A handle 53 on the upper end of the rod 50 enables the same to be readily manipulated so that a cross pin 54 in the rod may either engage the top of sleeve 51 and hold said rod clear of the floor plate, or enter a vertical slot 54a in the sleeve so that the rod may drop into the orifice.

Figure 6:
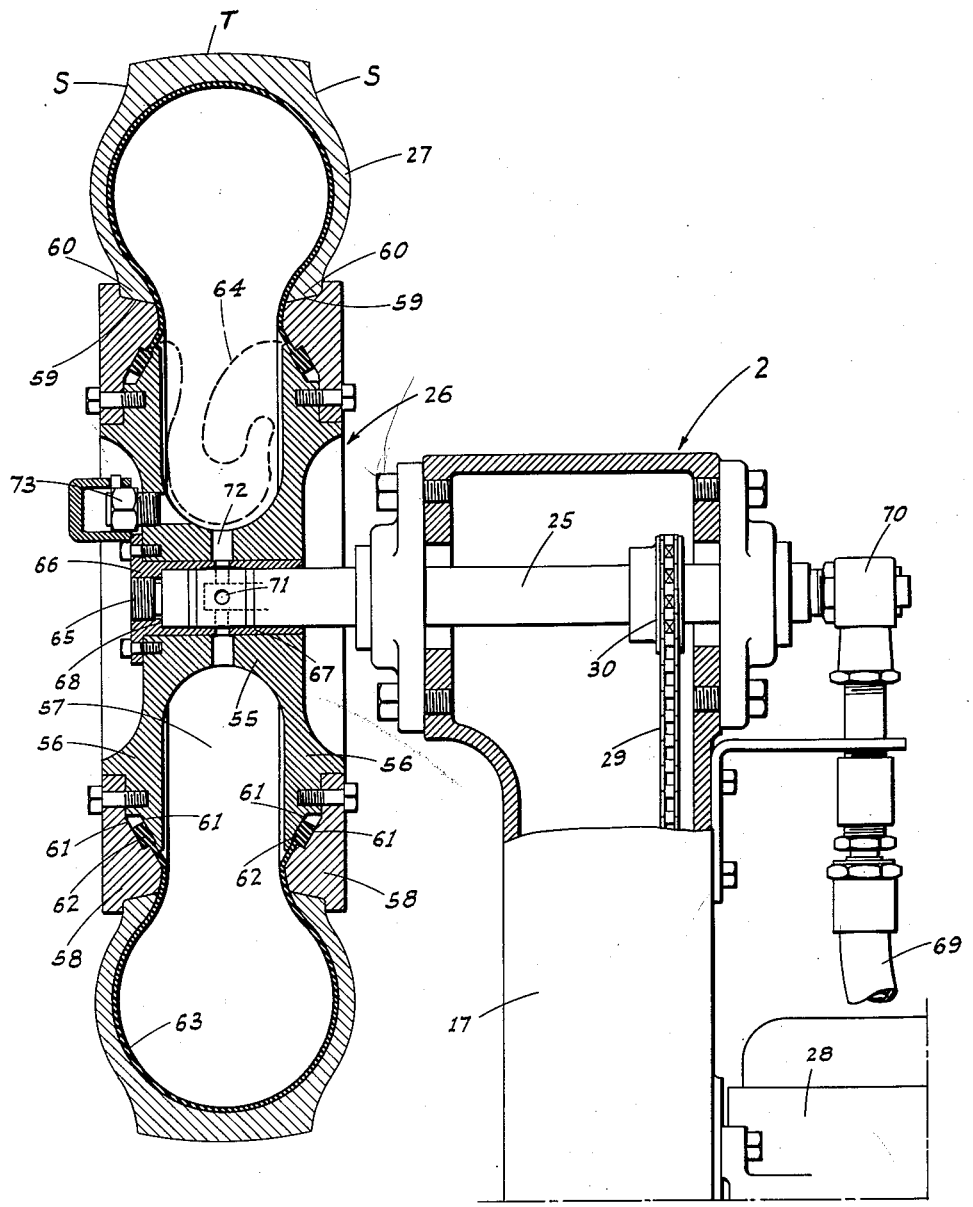
Fig. 6 is a similar view, taken on line 6—6 of Fig. 1.

The wheel 26 on which the tire is mounted is shown in detail in Fig. 6, and comprises a hub portion 55 from which laterally spaced flanges 56 project radially out to provide a deep well 57 therebetween.

Other side flange members 58 are secured to and project radially out from flanges 56; said members at their outer circumference being formed with continuous retaining seats 59 for the beads 60 of the tire. These seats are spaced apart laterally a distance to maintain the beads in their normally spaced relation.

The flanges 56 and members 58 overlap for a portion of their radial extent, and are formed with opposed annular grooves 61 which together cooperate to receive and clamp the enlarged base beads 62 of a full-circle, flexible and collapsible diaphragm 63 in air-tight relation; the diaphragm when inflated being substantially U-shaped in cross section.

The diaphragm 63—when deflated—is collapsed into the well 57, as indicated at 64, so that the tire may be easily mounted on the wheel 26. The diaphragm is shaped transversely so that when inflated it fits snugly within the tire, as shown, and thus takes the place of the usual inner tube; the tire then assuming its normal form, and with the beads thereof drivingly locked to the seats 59.

In order to removably mount the wheel 26 on the spindle 25, in driving relation, said spindle at its outer end is provided with a short threaded extension 65 adapted to screw into a socket 66 in a sleeve 67 secured in the hub 55. The inner end of the socket forms a shoulder 68 which engages the adjacent end of the spindle when the wheel and tire are in the desired transversely alined position with the buffing rasp.

Air is fed to the diaphragm, to expand the same into the tire from a collapsed position, by means of an air hose 69 connected to a source of air supply under pressure (not shown) and thence extending to a swivel unit 70 of conventional form which connects with the end of spindle 25 opposite that to which the wheel is connected. The spindle 25 is tubular so that communication is established between the hose 69 and radial outlets 71 in said spindle within the hub 55.

The outlets 71 aline with ports 72 in the hub 55 and sleeve 67 and communicate with the well 57. A pressure relief valve 73 connects the well with the outside atmosphere so that the air within the well and tire may be held at any desired pressure.

It will be understood that a different size wheel must be provided for each different rim or bead size of tire being buffed; the simple screw connection between the wheel and spindle 25 enabling a wheel change to be effected in a minimum of time.

In order that the above described machine may also be used in connection with a tread building operation subsequent to a buffing operation, a stitching unit, indicated at 74, may be mounted on the front wall 4 of frame 3 in position to be engaged with the tire 27, but normally held out of the way, as shown, so as not to interfere with buffing operations. Such unit 74 is fully shown and described in copending application, Serial No. 796,939 filed March 3, 1959, and forms no part of the present invention.

In operation, the carriage 2 is first retracted from stationary unit 1 and locked against movement by the rod 50 in the manner previously described. The tire is then mounted on the wheel 26, and diaphragm 63 inflated; the tire then being ready for buffing. Before releasing the locking rod 50, a template 45 of the proper form for the particular tire to be buffed is mounted on the plate 44. Thereafter, with the locking rod released, the carriage 2 is advanced toward stationary unit 1; the hand wheel 39 being initially turned in one direction or the other and according to the diameter of the tire on the wheel, so that when the template contacts roller 12, the tire will be just clear of the buffing rasp 6.

The rasp motor 5 is then put into operation to rotate the rasp in a clockwise direction, and the hand wheel 39 is turned—while the template is held against the roller 12—in a direction to allow the carriage 2 to be advanced, by manipulation of the handle bar 21, only sufficient to engage the tire with the rasp so as to make a shallow cut. With the tire rotating motor in operation, as well as the suction fan motor 9, the carriage 2 is then swung slowly toward the right, turning about the yoke trunnions 15 as an axis, and while maintaining the template 45 in contact with the roller 12, whereby the rasp buffs the right hand portion of the tread of the tire and then the adjacent portion of the right hand sidewall thereof.

After the right hand buffing action on the tire has been effected, the carirage 2 is returned to a central position and retracted somewhat while the motor 5 is reversed. The carriage 2 is then again advanced so that the template 45 and roller 12 are reengaged, and—without any change in the setting of the hand wheel 39—said carriage 2 is swung slowly to the left whereby the rasp buffs the left hand portion of the tread and the adjacent portion of the left hand sidewall of the tire.

If another or finishing buffing pass is desired, the hand wheel 39 is rotated to retract the template 45 and thus permit further advance of the carriage 2 and tire thereon, and the above right and left hand buffing operations are repeated.

During the above buffing operations, the part of the tire in contact with the rasp is disposed within the mouth of the hood 7, and all dust or cuttings made by the rasp are carried away from the vicinity of the operator by the suction fan 8.

With each pass of the rasp over the tread and adjacent sidewall portions of the tire, the depth of cut is mechanically controlled, and the new contour will be precisely and accurately that predetermined by the template 45.

After the tire has been buffed, the new over-all diameter thereof can be read directly from the scale 43. This will determine the proper matrix size for the subsequent tread vulcanizing operation without any other measurement being required.

When the buffing has been completed, the motors are stopped and the carriage 2 is pulled away from the stationary unit 1 and held in a locked position by rod 50 while the buffed tire is removed from the wheel after the diaphragm 63 is deflated, or while the diaphragm remains inflated and a tread building operation is being carried out on the tire by the stitching unit 74.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention the following is claimed as new and useful, and upon which Letters Patent are desired:

1. A tire buffing machine comprising an upstanding frame, a vertical-axis rotary buffing rasp supported on the frame and exposed at the front thereof, a horizontally movable and swingable carriage ahead of the rasp, a transverse-axis rotary tire supporting wheel mounted on the carriage with said axis substantially on a level with the rasp, and a structure between the frame and carriage guiding the latter for advancing movement toward the rasp and for engagement of the tire therewith, and independently guiding the carriage for lateral swinging movements with the tire tire remaining in rasp engagement; said structure including a yoke attached to the frame below the rasp, means mounting the yoke for rotation about a vertical axis disposed between the axis of the rasp and that of the wheel, and a member rigid with the carriage extending horizontally toward and slidably projecting through the yoke.

2. A tire buffing machine comprising an upstanding frame, a vertical-axis rotary buffing rasp supported on the frame and exposed at the front thereof, a horizontally movable and swingable carriage ahead of the rasp, a transverse-axis rotary tire supporting wheel mounted on the carriage with said axis substantially on a level with the rasp, a structure between the frame and carriage guiding the latter for advancing movement toward the rasp and for engagement of the tire therewith, and independently guiding the carriage for lateral swinging movements with the tire remaining in rasp engagement, a vertical-axis roller supported from the frame in a fixed position, the roller being the same diameter as the rasp and the axis thereof being alined with that of the rasp, a horizontal template mounted on said carriage determining the contour of the tread of the tire supported on said wheel, said template being disposed at the level of the roller to engage the edge of the same, means mounting the template on the carriage for horizontal adjustment relative thereto, and means to effect such adjustment.

3. A machine, as in claim 2, in which the carriage is floor-supported and arranged for manual manipulation over the floor and said structure comprises a yoke below and in front of the rasp, means mounting the yoke in connection with the frame for rotation about a vertical axis, and a horizontal member rigid with the carriage extending toward and slidably engaged in and projecting through the yoke.

4. A structure, as in claim 3, in which the axis of the yoke is disposed in a plane between the axis of the rasp and that of the tire supporting wheel.

References Cited in the file of this patent

UNITED STATES PATENTS

| | | |
|---|---|---|
| 2,294,047 | Pollock | Aug. 25, 1942 |
| 2,392,667 | Hawkinson | Jan. 8, 1946 |
| 2,515,167 | Arel | July 18, 1950 |
| 2,636,277 | Hawkinson | Apr. 28, 1953 |
| 2,648,937 | Hawkinson | Aug. 18, 1953 |
| 2,769,283 | Brown | Nov. 6, 1956 |
| 2,918,116 | Mooney | Dec. 22, 1959 |

FOREIGN PATENTS

| | | |
|---|---|---|
| 174,728 | Great Britain | Feb. 1, 1922 |